UNITED STATES PATENT OFFICE.

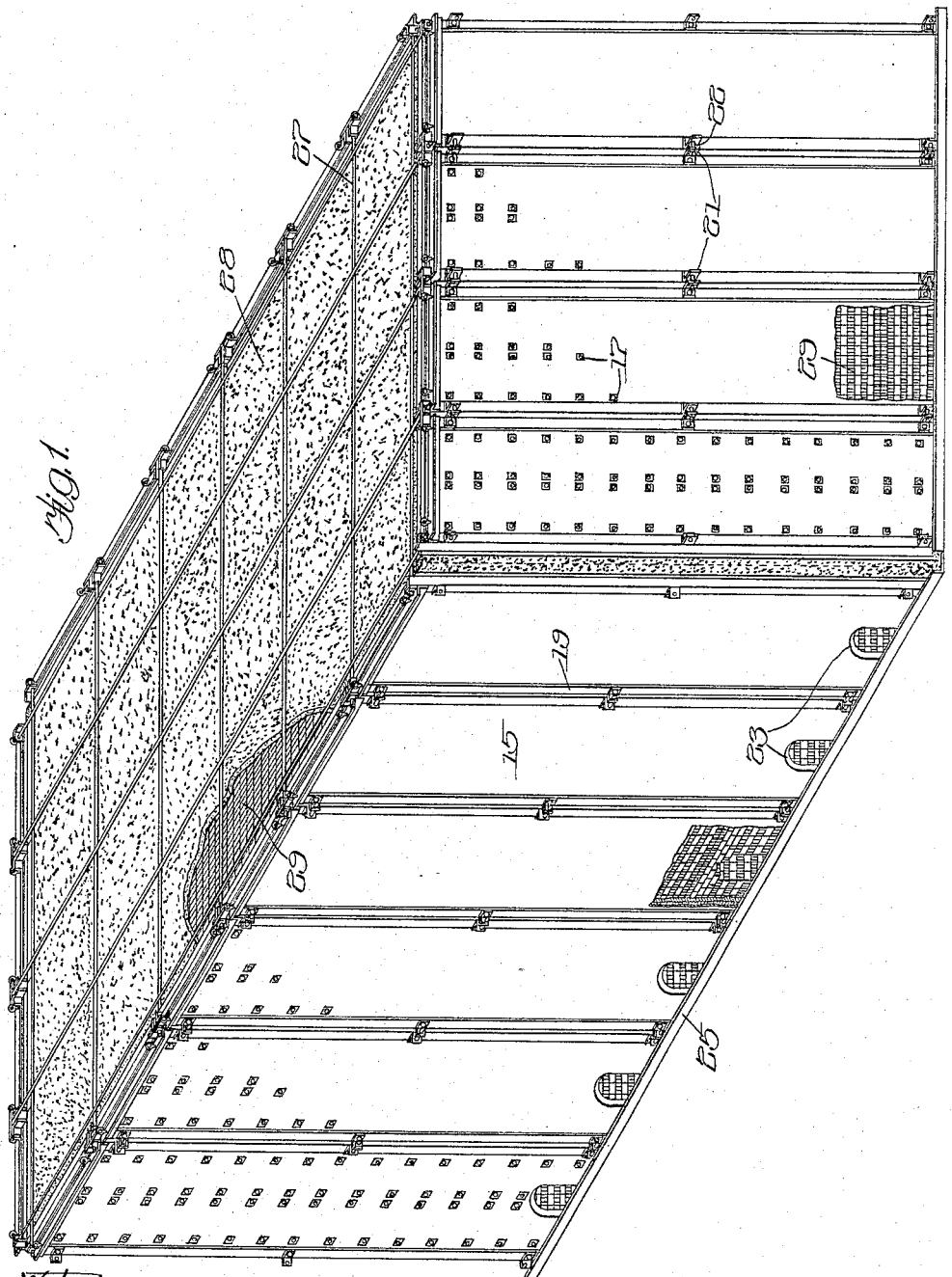

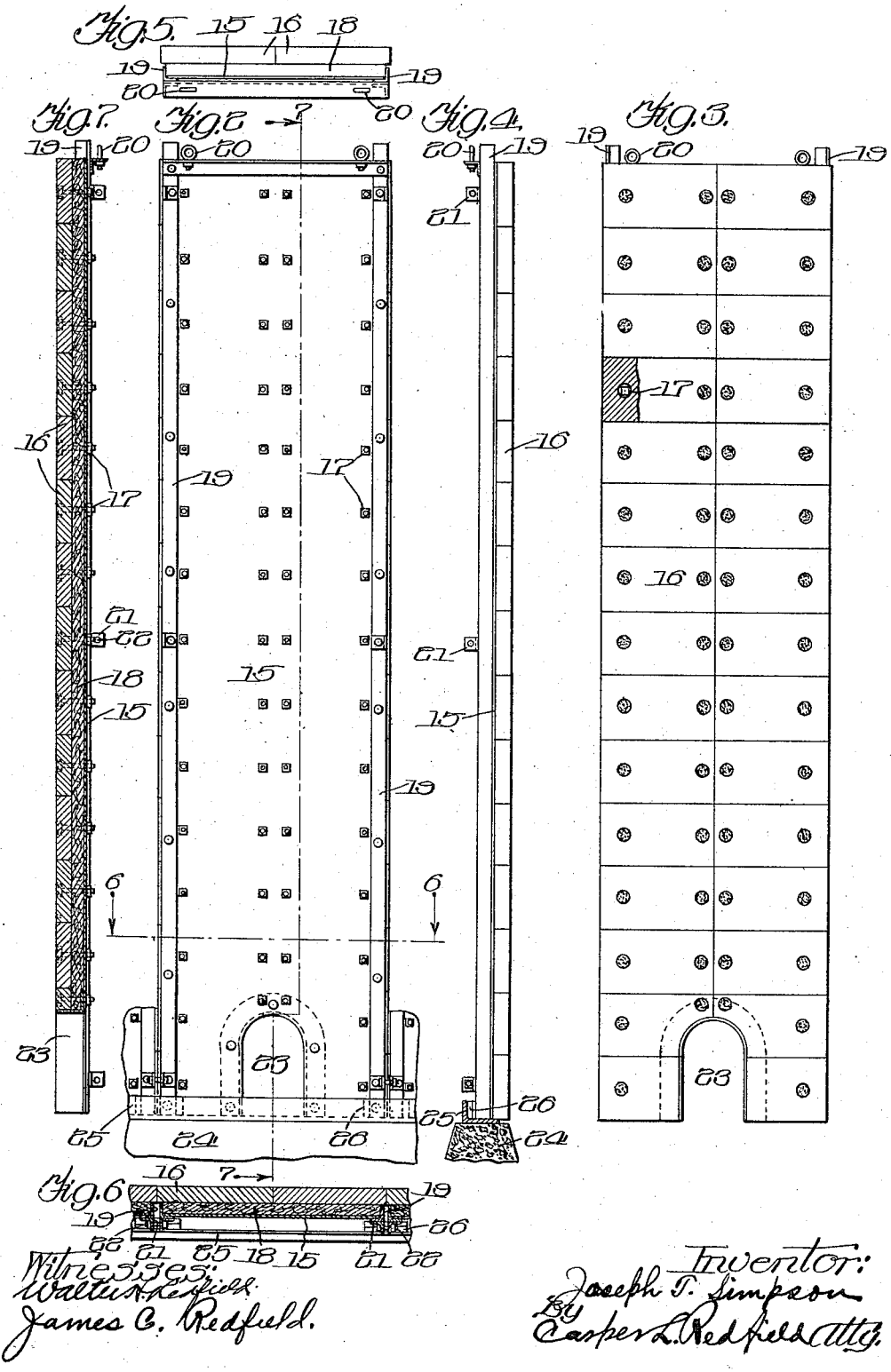

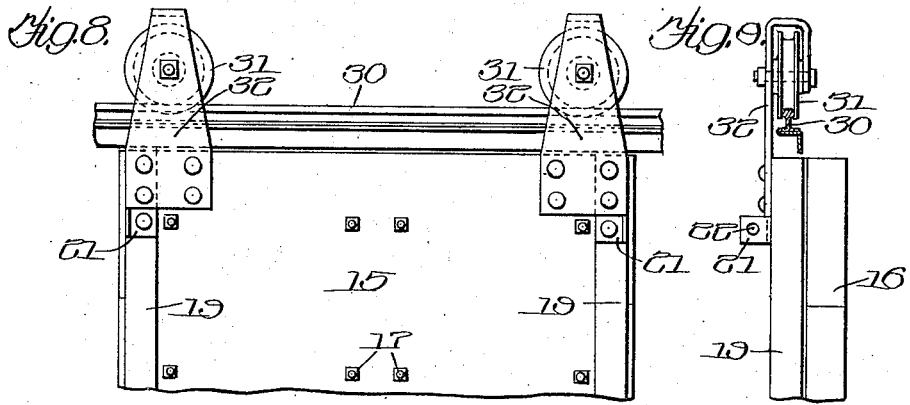
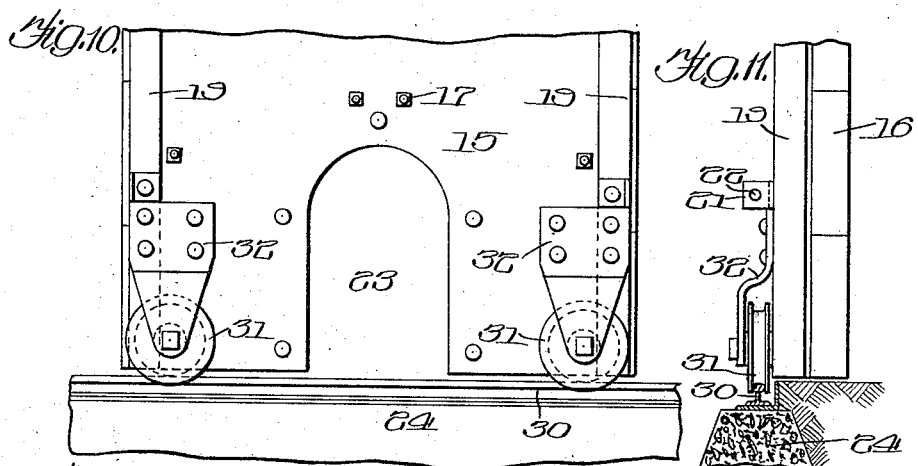
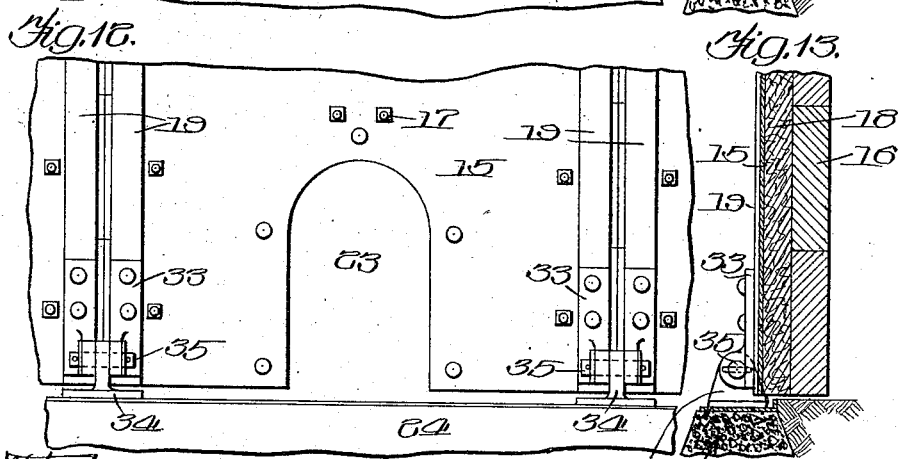

JOSEPH T. SIMPSON, OF CHICAGO, ILLINOIS.

KILN.

1,178,184.  Specification of Letters Patent.  Patented Apr. 4, 1916.

Application filed August 5, 1912. Serial No. 713,280.

*To all whom it may concern:*

Be it known that I, JOSEPH T. SIMPSON, a citizen of the United States of America, and a resident of Chicago, county of Cook, and State of Illinois, have invented certain new and useful Improvements in Kilns, of which the following is a specification.

My invention relates to kilns for burning brick or other materials, and has for its object the construction of a kiln in sections which may be quickly assembled before, and quickly removed after, the bricks are burned.

In the accompanying drawings Figure 1 is an orthographic projection of the completed kiln with some parts broken away to show the brick in the interior; Figs. 2, 3 and 4 are front, back and side elevations, respectively of one section of the kiln; Fig. 5 is a plan of Fig. 2; Fig. 6 is a section on line 6—6 of Fig. 2; Fig. 7 is a section on line 7—7 of Fig. 2; Fig. 8 shows in front elevation a means of supporting the sections by rollers on an upper rail so that they may be moved in the manner common with sliding doors; Fig. 9 is a side elevation of Fig. 8; Fig. 10 is an elevation similar to Fig. 8 with the sections supported on a lower track; Fig. 11 is a side elevation of Fig. 10; Fig. 12 is an elevation similar to Fig. 10 but having its sections pivotally supported on brackets; and Fig. 13 is a section of Fig. 12.

In using open top kilns, it is common practice to build the kiln walls around a previously prepared pile of green brick, and after the brick are burned to tear down the kiln walls so that the burned brick may be removed.

It will be obvious that building a brick kiln and tearing it down each time a quantity of brick is to be burned is expensive both in the time and labor consumed and in the brick damaged by being repeatedly set in mortar. To reduce the expense as much as possible the kiln walls, or scoving, are usually made only one brick in thickness. Thin walls of this kind are objectionable because they permit loss of heat by radiation. I overcome these objections by making the scoving, or kiln walls, in sections which may be bolted together to form the kiln, and after the brick are burned may be removed in sections and used in the construction of a second kiln. One of these sections is shown in detail in Figs. 2 to 7, and each section is composed of a metal plate 15 to which is secured a facing of fire brick 16, held in place by bolts 17. Between the plate 15 and the brick 16 is a layer of insulating material 18, composed of asbestos, or other similar body. Secured at the edges of the plate 15 are angle irons 19 which have flanges extending toward the brick 16 to inclose the edges of the asbestos 18. These angle irons also serve to stiffen the plate 15 and maintain the section, as a whole, in its proper shape. Secured to the angle iron at the top of the plate are eye-bolts 20 by which a section may be lifted to put it in place when building a kiln or to remove it when it is desired to tear the kiln down. Secured at suitable places on the angle irons 19 are brackets 21, and bolts 22, extending through these brackets and similar brackets on an adjacent section, serve to connect two sections together. Part or all of the sections have openings 23 through which fire may be applied to brick within the kiln.

In ordinary practice there is a long kiln shed in which several kilns may be constructed, and over these kilns is usually a crane which may travel the length of the shed. This crane is used to carry the green brick to the desired place in the shed and pile it up in the position at which the scoving is to be built around it. Later, the crane is used to remove the burned brick. When such a crane is used I employ it to lift the sections of my kiln by connecting it to the eye-bolts 20.

In applying my invention, a foundation 24, Fig. 4, is built around a section of the space within the shed, and on this foundation is a foundation plate or angle iron 25 for supporting the walls of the kiln. Ordinarily there will be several such sections of ground space inclosed by foundations 24. On the ground inclosed by one of these foundations the green brick is piled to the required height. The sections of scoving are then set upon the foundation plate 25, and adjacent sections are connected together by bolts 22. The lower parts of the scoving are then forced toward the brick within the kiln by means of wedges 26 driven in between the angle irons 19 and the upwardly projecting flange of the foundation plate 25. The upper ends of the angle irons 19 project above the sections of scoving, and these projecting ends serve as a means for connecting tie-bolts 27 across the top of the kiln to hold the top parts together. The joints between the sections of scoving are then closed by clay mortar, and a thin layer of mortar 28 is placed over the green brick 29. The kiln is then ready to be fired in the ordinary manner.

After the brick are properly burned, the tie-bolts 27 at the top, and the wedges 26 below, are released. The crane may then move an entire side from the brick burned to another pile ready to be burned, or the sections may be disconnected, and single sections, or groups of sections, may be moved from the first to the second place. Here the connections are made as before and the fire started to burn the new kiln full of brick.

It will be obvious from the foregoing that the scoving may be erected or removed quickly, and that in the erection and removal there is no loss of material used in the kiln walls. Also, that with scoving made in this way, there is much less loss of heat by radiation than when the walls consist simply of one layer of brick.

In cases where there is no crane for moving the sections of the kiln from place to place, I support the sections on rails by means of rollers. In Figs. 8 and 9, the sections are supported on an upper rail 30 by means of rollers 31 secured to brackets 32 riveted to the sections. The construction is similar to that used with sliding doors and will be understood from the drawings without special description.

In Figs. 10 and 11, the rail 30 is supported on the foundation 24, and the wheel supporting brackets 32 are secured to the bottom part of the section of scoving. This construction will also be obvious from the drawings.

In Figs. 12 and 13 I show an arrangement by which the kiln walls may be retained permanently in the same place and yet at the same time permit brick to be piled up and later be removed. In this case I secure brackets 33 to the lower ends of the angle irons 19, and on the foundation 24 I secure other brackets 34. The brackets 33 and 34 are then connected together by pivoting pins 35. As so arranged, an entire side, or end, of the kiln may be moved outward on its pivoting pins thus giving free access to the interior for piling up green brick or removing those which are burned. When green brick are set or piled up the sides and ends are raised on their pivots and are connected together by the tie-bolts 27 as before described.

What I claim is:—

1. A section for a kiln wall consisting of a metal plate, angle irons secured to the edges of the plate and having flanges projecting from one side of the plate, a layer of insulating material on the face of the plate and within the space inclosed by said flanges, a layer of fire brick over the insulating material and in contact with the flanges, and bolts for securing the fire brick to the plate.

2. A kiln having walls consisting of a series of vertical sections each formed of a metal outer plate having an inner facing of refractory material, brackets and bolts for securing adjacent sections to each other, tie-bolts for connecting the sections of opposite walls, a foundation upon which the walls rest, and a projection secured to the foundation and inclosing the lower parts of the walls to prevent their outward displacement.

3. A kiln having walls consisting of a series of vertical sections each formed of a metal outer plate having an inner facing of refractory material, tie-bolts for connecting the sections of opposite walls, a foundation upon which the walls rest, and a projection secured to the foundation and inclosing the lower parts of the walls to prevent their outward displacement.

4. In a brick kiln, a rectangular foundation, independent walls supported upon said foundation, each wall consisting of a series of sections having an inner face of fire resisting material, means for connecting and disconnecting the adjacent sections of each wall, and means for restraining the walls from outward displacement.

Signed at Chicago, Illinois this 3 day of August 1912.

JOSEPH T. SIMPSON.

Witnesses:
WALTER H. REDFIELD,
C. L. REDFIELD.

Copies of this patent may be obtained for five cents each, by addressing the "Commissioner of Patents, Washington, D. C."